(12) United States Patent
Wada et al.

(10) Patent No.: US 8,453,433 B2
(45) Date of Patent: Jun. 4, 2013

(54) EXHAUST GAS PURIFICATION DEVICE FOR INTERNAL COMBUSTION ENGINE

(75) Inventors: Katsuji Wada, Saitama (JP); Shinya Ishimaru, Saitama (JP); Tomoko Tsuyama, Saitama (JP); Jun Iwamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 12/811,826

(22) PCT Filed: Nov. 6, 2008

(86) PCT No.: PCT/JP2008/070231
§ 371 (c)(1),
(2), (4) Date: Jul. 6, 2010

(87) PCT Pub. No.: WO2009/087807
PCT Pub. Date: Jul. 16, 2009

(65) Prior Publication Data
US 2010/0275584 A1   Nov. 4, 2010

(30) Foreign Application Priority Data

Jan. 8, 2008  (JP) ................................ 2008-001697

(51) Int. Cl.
*F01N 3/36*  (2006.01)
(52) U.S. Cl.
USPC .................. 60/286; 60/278; 60/280; 60/285; 60/289; 60/295; 60/300; 60/301; 60/303
(58) Field of Classification Search
USPC .................. 60/278, 280, 282, 284, 285, 286, 60/287, 289, 295, 300, 301, 303, 307
See application file for complete search history.

(56) References Cited

U.S. PATENT DOCUMENTS

| | | |
|---|---|---|
| 5,471,836 A | 12/1995 | Takeshima et al. |
| 5,473,887 A | 12/1995 | Takeshima et al. |

(Continued)

FOREIGN PATENT DOCUMENTS

| | | |
|---|---|---|
| EP | 1 630 131 A1 | 3/2006 |
| EP | 1 783 336 A1 | 5/2007 |
| EP | 1 785 608 A2 | 5/2007 |

(Continued)

OTHER PUBLICATIONS

Japanese Office Action 2008-001697 mailed Aug. 7, 2012.

(Continued)

*Primary Examiner* — Thomas Denion
*Assistant Examiner* — Jorge Leon, Jr.
(74) *Attorney, Agent, or Firm* — Arent Fox LLP (57) ABSTRACT

An exhaust gas purification device for an internal combustion engine, in which a catalyst installed in an exhaust passage is quickly heated to the activation temperature of the catalyst. The exhaust gas purification device has a NOx purification catalyst (33) for adsorbing or occluding NOx in exhaust gas and reducing the NOx, a catalytic converter (31) installed at that position of an exhaust pipe (4) which is upstream of the NOx purification catalyst (33), a fuel reformer (50) installed separately from the exhaust pipe (4), producing a reformed gas, and supplying the reformed gas, as a reducing gas, into the exhaust pipe (4) from an introduction opening (14) formed in that portion of the exhaust pipe (4) which is upstream of the NOx purification catalyst (33) and the catalytic converter (31), and an ECU (40) which, while the exhaust gas air-fuel ratio is being set to be lean, supplies the reducing gas into the exhaust pipe (4) and controls at least one of a throttle valve (9), an EGR valve (13), and a turbocharger (8) to regulate the flow rate of the exhaust gas flowing in the exhaust pipe (4).

14 Claims, 5 Drawing Sheets

U.S. PATENT DOCUMENTS

| | | | |
|---|---|---|---|
| 2003/0066287 A1* | 4/2003 | Hirota et al. | 60/297 |
| 2003/0163988 A1* | 9/2003 | Kirwan et al. | 60/289 |
| 2004/0020447 A1* | 2/2004 | Taylor et al. | 123/3 |
| 2006/0101809 A1* | 5/2006 | Bodo et al. | 60/286 |
| 2006/0242946 A1 | 11/2006 | Taylor, III et al. | |
| 2007/0101698 A1* | 5/2007 | Goulette et al. | 60/284 |
| 2007/0130915 A1* | 6/2007 | Beckmann et al. | 60/285 |
| 2007/0271908 A1* | 11/2007 | Hemingway et al. | 60/286 |
| 2008/0060349 A1* | 3/2008 | Eyabi | 60/295 |
| 2008/0314031 A1* | 12/2008 | Shamis et al. | 60/295 |
| 2009/0025375 A1* | 1/2009 | Poojary et al. | 60/295 |
| 2009/0120072 A1* | 5/2009 | Dalla Betta et al. | 60/295 |
| 2009/0308057 A1* | 12/2009 | Fresnet et al. | 60/287 |

FOREIGN PATENT DOCUMENTS

| | | |
|---|---|---|
| JP | 05-106430 A | 4/1993 |
| JP | 2586738 B2 | 12/1996 |
| JP | 2600492 B2 | 1/1997 |
| JP | 2001-113134 A | 4/2001 |
| JP | 2001-234737 B2 | 8/2001 |
| JP | 2002-054427 A | 2/2002 |
| JP | 2004-138033 A | 5/2004 |
| JP | 2005-002905 A | 1/2005 |
| JP | 3642273 B2 | 2/2005 |
| JP | 2006-233837 A | 9/2006 |
| JP | 2007-162501 | 6/2007 |
| WO | WO 2007/008320 A2 | 1/2007 |
| WO | WO 2007/066835 A1 | 6/2007 |

OTHER PUBLICATIONS

T. Tanaka et al., "Development of $NO_x$ Storage-Reduction Three-way Catalyst System," Collective Papers of Society of Automotive Engineers of Japan, Oct. 1995, vol. 26, No. 4.

N. Satoh et al., "A $NO_x$ Reduction System Using Ammonia Storage-Selective Catalytic Reduction in Rich and Lean Operations", 15 Aachener Kolloquium Fahrzeug- und Motorentechnik 2006, pp. 259-270.

* cited by examiner

EXHAUST GAS PURIFICATION DEVICE FOR INTERNAL COMBUSTION ENGINE

CROSS-REFERENCED TO RELATED APPLICATION

This application is a National Stage entry of International Application No. PCT/JP2008/070231, filed Nov. 6, 2008, which claims priority to Japanese Patent Application No. 2008-001697, filed Jan. 8, 2008, the disclosure of the prior applications are incorporated in its entirety by reference.

TECHNICAL FIELD

The present invention relates to an exhaust purification device for an internal combustion engine. More specifically, it relates to an exhaust purification device for an internal combustion engine provided with a NOx purification catalyst that adsorbs or occludes NOx in exhaust, and that reduces the NOx thereby adsorbed or occluded.

In addition, in the present invention, the terminology "rich" indicates a ratio of air/fuel (hereinafter referred to as "air/fuel ratio") of fuel that is smaller than a stoichiometric air/fuel ratio, and the terminology "lean" indicates an air/fuel ratio of fuel that is larger than the above stoichiometric air/fuel ratio. Moreover, in the following explanation, a mass ratio of air and fuel in a mixed gas flowing into the engine is called an engine air/fuel ratio, and a mass ratio of air and combustible gas inside exhaust plumbing is called an exhaust air/fuel ratio.

In addition, as a method for controlling the exhaust air-fuel ratio, there is a method in which the exhaust air-fuel ratio is made low (hereinafter referred to as "enriching") by reducing the intake air amount of the engine and adjusting the fuel injection (hereinafter referred to as "main injection") amount contributing to torque, and a method in which the exhaust air-fuel ratio is enriched by performing fuel injection that does not contribute to torque (hereinafter referred to as "post injection") to flow unburned fuel into the exhaust path.

BACKGROUND ART

Thus far, techniques have been known for purifying nitrogen oxides (hereinafter referred to as "NOx") contained in exhaust.

For example, in Patent Documents 1 and 2 and Non-patent Document 1, an exhaust purification device is shown that is provided with an oxidation catalyst and a NOx occlusion-reduction catalyst (hereinafter referred to as "LNT") in an exhaust channel. With this exhaust purification device, NOx in the exhaust having passed through the oxidation catalyst is occluded by reacting with an alkali metal, alkaline earth metal or the like during lean operation in which the exhaust is oxygen excessive, and then the NOx thus occluded is reduced during rich operation in which the oxygen concentration of the exhaust is low. With this exhaust purification device, occlusion of NOx and reduction of NOx can be performed periodically by repeating lean operation and rich operation.

In addition, in Non-patent Document 2, for example, a method is shown in which NOx is adsorbed on a catalyst during lean operation in which the exhaust is oxygen excessive, then rich operation is performed and a state in which the oxygen concentration in the exhaust is low is periodically produced, while carbon monoxide is periodically synthesized and supplied, thereby periodically reducing the NOx adsorbed during lean operation.

More specifically, in the method shown in Non-patent Document 2, first, nitrogen monoxide and nitrogen dioxide existing in the exhaust is adsorbed to the catalyst during lean operation in which the exhaust is oxygen excessive, by way of the following formulas (1) to (3).

$$NO \rightarrow NO \text{ (adsorption)} \tag{1}$$

$$2NO + O_2 \rightarrow 2NO_2 \tag{2}$$

$$NO_2 \rightarrow NO_2 \text{ (adsorption)} \tag{3}$$

Next, rich operation is performed while carbon monoxide is synthesized. The carbon monoxide thereby synthesized produces hydrogen by way of the water-gas shift reaction shown in the following formula (4), in a situation where the oxygen partial pressure is low.

$$CO + H_2O \rightarrow H_2 + CO_2 \tag{4}$$

Furthermore, ammonia is produced by reacting this hydrogen with carbon monoxide in a reducing atmosphere, and this ammonia is adsorbed to the catalyst by way of the following formula (5).

$$5H_2 + 2NO \rightarrow 2NH_3 \text{ (adsorption)} + 2H_2O \tag{5}$$

With the ammonia produced by carbon monoxide according to the above as the final reducing agent, NOx in the exhaust or NOx adsorbed to the catalyst is reduced by way of the following formulas (6) to (8).

$$4NH_3 + 4NO + O_2 \rightarrow 4N_2 + 6H_2O \tag{6}$$

$$2NH_3 + NO_2 + NO \rightarrow 2N_2 + 3H_2O \tag{7}$$

$$8NH_3 + 6NO_2 \rightarrow 7N_2 + 12H_2O \tag{8}$$

Incidentally, NOx may be discharged without being reduced in the LNT up to when the LNT reaches a predetermined activation temperature, such as immediately after engine startup. A method has been known for quickly raising the temperature of the LNT in which the idle revolution speed of the engine is raised, and the main injection timing is retarded; however, according to this method, fuel economy may deteriorate.

Consequently, a method for raising the temperature of the LNT that makes the NOx purification rate optimum while controlling deterioration of the fuel economy is illustrated in Patent Document 3, for example.

Alternatively, in Patent Document 4, for example, an exhaust purification system is shown that is provided with an LNT in the exhaust channel, and is further provided upstream of this LNT with a fuel reformer that produces a reducing gas containing hydrogen and carbon monoxide by reforming hydrocarbon fuel. In this exhaust purification system in particular, a fuel reformer is used that produces a reducing gas such that hydrogen is more abundant than carbon monoxide by volume ratio. According to this system, it becomes possible to selectively reduce the NOx in the exhaust by adding reducing gas containing hydrogen from an upstream side of the LNT into the exhaust.

Here, as a method of producing reducing gas from hydrocarbon fuel, for example, a partial oxidation reaction using oxygen as an oxidant has been known, as shown in the following formula (9).

$$C_nH_m + 1/2nO_2 \rightarrow nCO + 1/2mH_2 \tag{9}$$

This partial oxidation reaction is an exothermic reaction using fuel and oxygen, and the reaction progresses spontaneously. As a result, once the reaction begins, hydrogen can be continuously produced without supplying heat from outside. In addition, in such a partial oxidation reaction, in a case of fuel and oxygen coming to coexist in a high temperature state, the combustion reaction as shown in the following formula (10) also progresses.

$$C_nH_m+(n+1/4m)O_2 \to nCO_2+1/2mH_2O \qquad (10)$$

Moreover, the steam reforming reaction, which uses steam as an oxidant, shown in the following formula (11) has been known.

$$C_nH_m+nH_2O \to nCO+(n+1/2m)H_2 \qquad (11)$$

This steam reforming reaction is an endothermic reaction using fuel and steam, and is not a reaction that progresses spontaneously. As a result, the steam reforming reaction is an easily controlled reaction relative to the partial oxidation reaction described above.

Patent Document 1: Japanese Patent No. 2586738
Patent Document 2: Japanese Patent No. 2600492
Patent Document 3: Japanese Unexamined Patent Application Publication No. 2005-2905
Patent Document 4: Japanese Patent No. 3642273
Non-patent Document 1: "Development of NOx Storage Reduction Three-way Catalyst System," Collective Papers of Society of Automotive Engineers of Japan, Vol. 26, No. 4, October 1995
Non-patent Document 2: "A NOx Reduction System Using Ammonia Storage-Selective Catalytic Reduction in Rich and Lean Operations," 15 Aachener Kolloquium Fahrzeug- and Motorentechnik 2006 p. 259-270

DISCLOSURE OF THE INVENTION

Problems to be Solved by the Invention

However, as illustrated in Patent Documents 1, 2 and 3, and Non-patent Documents 1 and 2 mentioned above, for example, in a case in which lean operation and rich operation of the engine is repeated, there is the following problem during cold such as immediately after startup in particular.

For example, when the intake air amount reduces in order to make the exhaust air/fuel ratio rich, combustion in a state in which the engine is low temperature may become unstable. In addition, when executing post injection in order to make the exhaust air/fuel ratio rich, for example, so-called oil dilution, in which a portion of the fuel injected mixes with engine oil, may occur. Since it is particularly difficult for the fuel to be vaporized when cold, such oil dilution may progress. In addition, since most of the reducing agent contained in exhaust after post injection is uncombusted hydrocarbons, it is particularly difficult to oxidize when cold, and the hydrocarbons may be discharged downstream in the exhaust channel.

In addition, the exhaust purification system of Patent Document 4 is different from that exemplified in Patent Document 1, 2 and 3 described above, and specifically is a system that adds hydrogen, carbon monoxide and hydrocarbons into exhaust having an oxygen excess, irrespective of lean operation and rich operation.

However, in a case of providing a fuel reformer in an exhaust channel having an exhaust amount that regularly fluctuates, as in this exhaust purification system, it is necessary to increase the reaction time for which the reforming catalyst of the fuel reformer and the exhaust come into contact, in order to effectively produce hydrogen in this fuel reformer. However, in order to increase the reaction time as such, it is necessary to increase the size of the reforming catalyst, which may raise cost.

In addition, in order to operate the fuel reformer in a stable state, it is necessary to maintain the reaction temperature of the reforming catalyst of this fuel reformer to be constant. However, when providing a fuel reformer in an exhaust channel for which the oxygen amount and steam amount are always fluctuating as in the exhaust purification system of Patent Document 4 described above, it becomes difficult to operate the fuel reformer in a stable state, since the temperature is not kept constant.

In addition, although the LNT can also be raised in temperature by providing a fuel reformer in the exhaust channel and by radiation from this fuel reformer as in the exhaust purification system shown in Patent Document 4, it is not sufficient. Consequently, it has also been considered to make the fuel reformer larger; however, in such a case, the loss in fuel economy will also become large, and hydrocarbons may also be discharged in an unaltered state.

The present invention was made taking the aforementioned points into consideration, and has an object of providing an exhaust purification device of an internal combustion engine in which a catalyst provided in an exhaust passage is quickly heated to an activation temperature of the catalyst.

Means for Solving the Problems

In order to achieve the above objects, the present invention provides an exhaust purification device of an internal combustion engine (1) including a NOx purification catalyst (33) that is provided in an exhaust channel (4, 5) of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich. The exhaust purification device includes a catalytic converter (31) that is provided in the exhaust channel on an upstream side from the NOx purification catalyst, and continuously reduces NOx in exhaust using a reducing gas; a fuel reformer (50) that is provided separately from the exhaust channel, produces a reducing gas containing hydrogen and carbon monoxide by reforming fuel, and supplies the reducing gas from an inlet (14) provided in the exhaust channel upstream of the NOx purification catalyst and the catalytic converter into the exhaust channel; an intake amount control valve (9) that is provided to an intake channel (2, 3) of the internal combustion engine; an exhaust recirculation amount control valve (13) that is provided to an exhaust recirculation channel (6) in which a portion of exhaust flowing through the exhaust channel is recirculated to the intake channel; a turbocharger (8) that compresses intake air flowing through the intake channel; and a control means (40) for adjusting, while the exhaust air/fuel ratio is set to lean, an exhaust flow rate of exhaust flowing through the exhaust channel by supplying reducing gas from the fuel reformer and controlling at least one among the intake amount control valve, the exhaust recirculation amount control valve, and the turbocharger.

According to this configuration, the catalytic converter is provided on an upstream side of the NOx purification catalyst, and furthermore, reducing gas containing hydrogen and carbon monoxide is supplied from this an upstream side of this catalytic converter. In this way, even if immediately after startup of the internal combustion engine, for example, the catalytic converter can be quickly raised in temperature up to the activation temperature thereof by supplying reducing gas containing hydrogen and carbon monoxide, which excel oxidation reactivity at low temperatures.

In addition, while setting the exhaust air/fuel ratio to lean, exhaust having an oxygen concentration, hydrogen concentration, and carbon monoxide concentration that are high can be supplied to the catalytic converter 31 by supplying such a reducing gas. Therefore, an oxidation reaction can be realized in the catalytic converter from a low temperature. As described above, the aforementioned problems occurring by reducing the intake air amount and executing post injection at low temperatures, i.e. deterioration in fuel economy, occurrence of oil dilution, destabilization in combustion of the internal combustion engine, etc. can be avoided by raising the temperature of the catalytic converter by supplying reducing gas.

In addition, by providing the fuel reformer producing reducing gas to be separate from the exhaust channel, reducing gas can always be produced at optimal efficiency, irrespective of the operating state of the internal combustion engine, the oxygen concentration and steam concentration of exhaust, etc., and this reducing gas can be supplied into the exhaust channel. Moreover, it becomes possible to supply reducing gas in response to requirements such as the operating state of the internal combustion engine by providing the fuel reformer to be separate from the exhaust channel.

On the other hand, in a case of providing the fuel reformer inside the exhaust channel, it is necessary to enlarge the fuel reformer so as to be able to operate without influencing the components, temperature, and flow rate of the exhaust; however, according to this configuration, it is possible to perform operation stably without enlarging the device by providing the fuel reformer to be separate from the exhaust channel. In addition, by providing the fuel reformer to be separate from the exhaust channel, it becomes possible to activate the catalyst provided to the fuel reformer at an early stage by performing control of an independent system from the control of the internal combustion engine.

In order to achieve the above objects, the present invention provides an exhaust purification device of an internal combustion engine (1) including a NOx purification catalyst (33) that is provided in an exhaust channel (4, 5) of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich. The exhaust purification device includes a catalytic converter (31) that is provided in the exhaust channel on an upstream side of the NOx purification catalyst, and continuously reduces NOx in exhaust using a reducing gas; a fuel reformer (50) that is provided separately from the exhaust channel, produces a reducing gas containing hydrogen and carbon monoxide by reforming fuel, and supplies the reducing gas from an inlet (14) provided in the exhaust channel upstream of the NOx purification catalyst and the catalytic converter into the exhaust channel; an intake amount control valve (9) that is provided to an intake channel (2, 3) of the internal combustion engine; an exhaust recirculation amount control valve (13) that is provided to an exhaust recirculation channel (6) in which a portion of exhaust flowing through the exhaust channel is recirculated to the intake channel; a turbocharger (8) that compresses intake air flowing through the intake channel; and a control means (40) for adjusting, while the exhaust air/fuel ratio is set to lean, an exhaust air/fuel ratio of exhaust flowing through the exhaust channel by supplying reducing gas from the fuel reformer and controlling at least one among the intake amount control valve, the exhaust recirculation amount control valve, and the turbocharger.

According to this configuration, effects similar to the exhaust purification device of an internal combustion engine described above can be exerted.

Preferably, the reducing gas produced by the fuel reformer is at a pressure higher than atmospheric pressure and contains more carbon monoxide than hydrogen by volume ratio.

According to this configuration, more carbon monoxide is contained in the reducing gas than hydrogen by volume ratio. Carbon monoxide is catalytically combusted at a lower temperature than hydrogen. This catalytic converter can be effectively raised in temperature from a low temperature by supplying such a reducing gas containing carbon monoxide to the catalytic converter. In addition, along with supplying such a reducing gas, this catalytic converter can be more effectively raised in temperature by palladium, rhodium, or the like, which adsorb large amounts of carbon monoxide, being contained in the catalytic converter.

In addition, reducing gas can be supplied into the exhaust channel without adding an extra device by supplying reducing gas of a pressure higher than atmospheric pressure.

Preferably, the exhaust purification device further includes a first temperature estimation means (26, 40) for estimating or detecting, with a temperature of the catalytic converter as a first catalyst temperature, the first catalyst temperature (TTWC). The control means includes a first activation means (40, 50) for supplying reducing gas from the fuel reformer into the exhaust channel, in a case in which the first catalyst temperature estimated or detected by the first temperature estimation means is lower than a predetermined first judgment temperature (TATH), until the first catalyst temperature reaches the first judgment temperature.

According to this configuration, reducing gas produced by the fuel reformer is supplied on an upstream side of the catalytic converter until the temperature of the catalytic converter reaches the predetermined first judgment temperature. Herein, the catalytic converter can be quickly raised in temperature up to the activation temperature, for example, by setting the first judgment temperature to the activation temperature of the catalytic converter.

Preferably, the exhaust purification device further includes a second temperature estimation means (27, 40) for estimating or detecting, with a temperature of the NOx purification catalyst as a second catalyst temperature (TLNC), the second catalyst temperature. The control means includes a second activation means (40, 50) for supplying reducing gas from the fuel reformer into the exhaust channel, in a case in which, after the first catalyst temperature (TTWC) estimated or detected by the first temperature estimation means has reached the first judgment temperature (TATH), the second catalyst temperature (TLNC) estimated or detected by the second temperature estimation means is lower than a predetermined second judgment temperature (TBTH), until the second catalyst temperature reaches the second judgment temperature.

According to this configuration, after the catalytic converter has reached the first judgment temperature, reducing gas is supplied until the NOx purification catalyst reaches the second judgment temperature. Herein, when the first judgment temperature is set to the activation temperature of the catalytic converter, for example after the catalytic converter has reached the activation temperature, the temperature of the exhaust is raised by the oxidation reaction in this catalytic converter, thereby enabling the NOx purification catalyst provided downstream of the catalytic converter to rise in temperature quickly.

Preferably, the flow rate (GEATV) of exhaust flowing through the exhaust channel while supplying reducing gas by the first activation means is larger than a flow rate (GEBTV) of exhaust flowing through the exhaust channel while supplying reducing gas by the second activation means.

According to this configuration, the flow rate of exhaust until when the temperature of the catalytic converter reaches the first judgment temperature is larger than the flow rate of exhaust after the temperature of the catalytic converter has reached the first judgment temperature. In other words, after the temperature of the catalytic converter has reached the first judgment temperature, the oxidation reaction in the catalytic converter progresses due to limiting the flow rate of the exhaust, and the temperature of the exhaust can be further raised. This enables the NOx purification catalyst on a downstream side of the catalytic converter to rise in temperature quickly.

Preferably, a supply amount (GRGATV) of reducing gas while supplying reducing gas by the first activation means is less than a supply amount (GRGBTV) of reducing gas while supplying reducing gas by the second activation means.

According to this configuration, the supply amount of reducing gas until when the temperature of the catalytic converter reaches the first judgment temperature is less than the supply amount after the temperature of the catalytic converter has reached the first judgment temperature. In other words, after the temperature of the catalytic converter has reached the first judgment temperature, the oxidation reaction in the catalytic converter progresses due to the supply amount of reducing gas being made large, and the temperature of the exhaust is caused rise further. This enables the NOx purification catalyst on a downstream side of the catalytic converter to rise in temperature quickly.

Preferably, the second activation means makes the supply amount (GRGBT) of reducing gas supplied into the exhaust channel to be larger in accordance with the first catalyst temperature (TTWC) estimated or detected by the first temperature estimation means becoming higher.

In addition, according to the present embodiment, the supply amount of reducing gas is also increased with the rise in temperature of the catalytic converter. In other words, reducing gas of an amount depending on the activity of the catalytic converter can be supplied. This enables an amount of extra reducing gas discharging to a downstream side without being completely oxidized by the catalytic converter to be reduced.

Preferably, the exhaust air/fuel ratio of exhaust flowing into the catalytic converter is always at least a stoichiometric ratio while supplying reducing gas from the fuel reformer.

Preferably, the fuel reformer produces reducing gas with carbon monoxide as a main component by way of a partial oxidation reaction of hydrocarbon fuel and air.

According to this configuration, this fuel reformer can be made a smaller size by producing reducing gas by way of the partial oxidation reaction. In other words, this is because a device to supply extra energy from outside does not need to be provided since the partial oxidation reaction as described above is an exothermic reaction, and once the reaction starts, the reaction progresses spontaneously. In addition, there is also no need to also provide a converter and system for concentrating hydrogen of a shift reaction, etc. Moreover, the light-off time of the fuel reformer can be shortened by making the fuel reformer to be small in this way. Therefore, reducing gas can be quickly supplied into the exhaust channel as needed.

Incidentally, when fuel is reformed by way of the partial oxidation reaction, higher hydrocarbons having high combustion temperatures are generated in a small amount while the fuel reformer is lighting off. If such higher hydrocarbons flow into the NOx purification catalyst, purification may become difficult. However, the higher hydrocarbons are easily adsorbed to the catalyst at low temperatures or an insignificant amount. As a result, by providing the catalytic converter on an upstream side of the NOx purification catalyst as described above, such higher hydrocarbons are immediately adsorbed and can be purified by the catalytic converter.

EXPLANATION OF REFERENCE NUMERALS

1 Engine (internal combustion engine)
2 Exhaust plumbing (exhaust channel)
3 Intake manifold (intake channel)
4 Exhaust plumbing (exhaust channel)
5 Exhaust manifold (exhaust channel)
6 Exhaust recirculation channel (exhaust recirculation channel)
8 Turbocharger
9 Throttle valve (intake amount control valve)
13 EGR valve (exhaust recirculation amount control valve)
14 Inlet
26 First exhaust temperature sensor (first temperature estimation means)
27 Second exhaust temperature sensor (second temperature estimation means)
31 Catalytic converter
33 NOx purification catalyst
40 Electronic control unit (control means, first and second temperature estimation means, first and second activation means)
50 Fuel reformer (first and second activation means)

PREFERRED MODE FOR CARRYING OUT THE INVENTION

Figure 1:
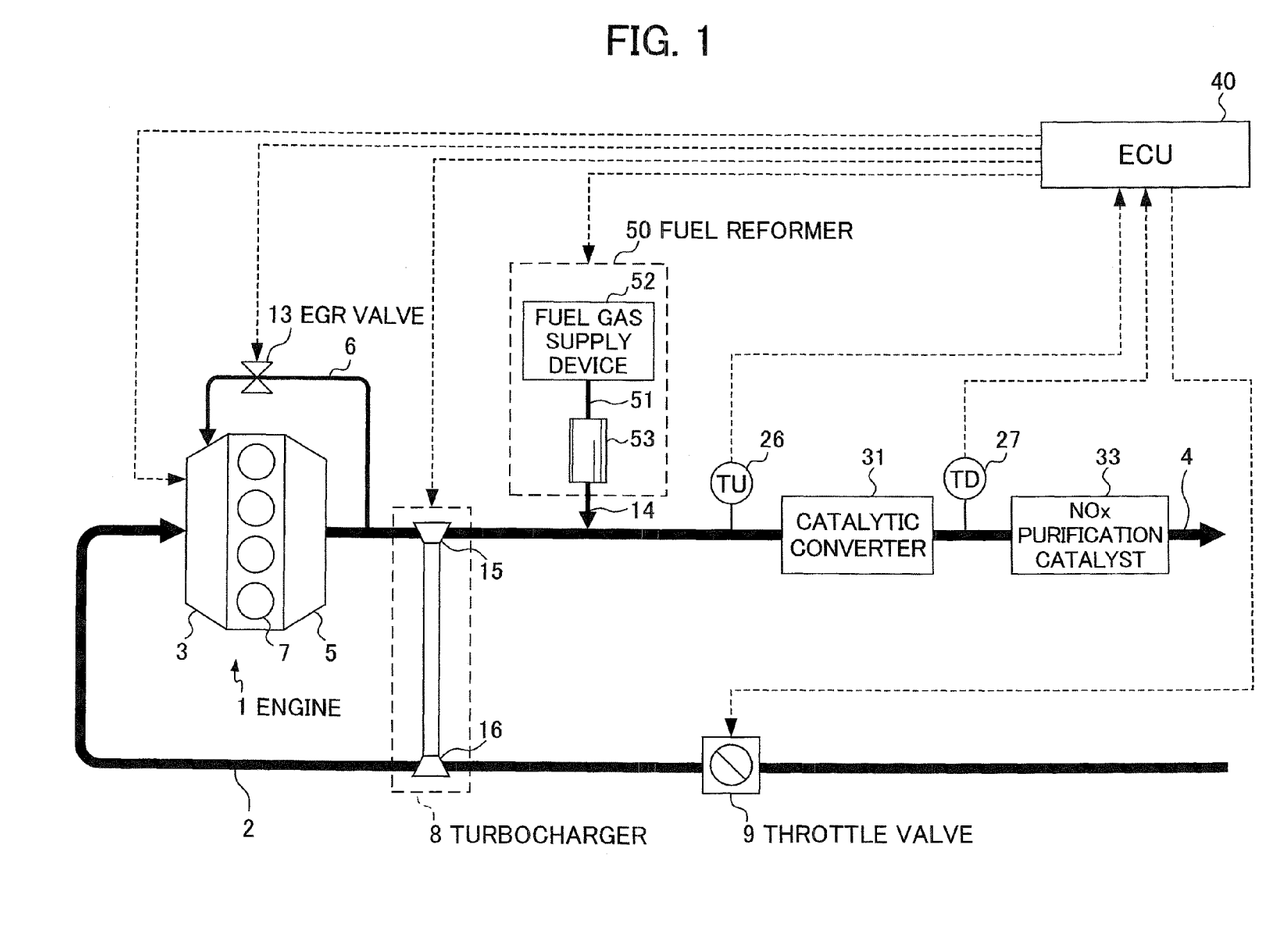
FIG. 1 is a view showing a configuration of an internal combustion engine and an exhaust purification device thereof according to an embodiment of the present invention.

FIG. 1 is a view showing a configuration of an internal combustion engine and an exhaust purification device thereof according to an embodiment of the present invention. An internal combustion engine (hereinafter referred to as "engine") 1 is a diesel engine that directly injects fuel into the combustion chamber of each cylinder 7, and fuel injectors, which are not illustrated, are provided to each of the cylinders 7. These fuel injectors are electrically connected by an electronic control unit (hereinafter referred to as "ECU") 40, and the valve-open duration and the valve-close duration of the fuel injectors are controlled by the ECU 40.

The engine 1 is provided with intake plumbing 2 in which intake air flows, exhaust plumbing 4 in which exhaust gas flows, an exhaust-gas recirculation path 6 that recirculates a portion of the exhaust in the exhaust plumbing 4 to the intake plumbing 2, and a turbocharger 8 that compresses and feeds intake air to the intake plumbing 2.

The intake plumbing 2 is connected to the intake port of each cylinder 7 of the engine 1 via a plurality of branches of an intake manifold 3. The exhaust plumbing 4 is connected to the exhaust port of each cylinder 7 of the engine 1 via a plurality of branches of an exhaust manifold 5. The exhaust-gas recirculation path 6 branches from the exhaust plumbing 4 and leads to the intake manifold 3.

The turbocharger 8 includes a turbine 15 provided to the exhaust plumbing 4, and a compressor 16 provided to the intake plumbing 2. The turbine 15 is driven by the kinetic energy of exhaust gas flowing in the exhaust plumbing 4. The compressor 16 is rotationally driven by the turbine 15, and compresses and feeds intake air into the intake plumbing 2. In addition, the turbine 15 is provided with a plurality of variable vanes, which are not illustrated, and is configured so that the turbine revolution number (revolution speed) can vary by way of causing the aperture of the variable vanes to change, thereby controlling the boost pressure (pressure of air flowing into the engine). The vane aperture of the turbine 15 is electromagnetically controlled by the ECU 40.

A throttle valve 9 that controls the intake air amount of the engine 1 is provided inside the intake plumbing 2 at an upstream side of the turbocharger 8. This throttle valve 9 is connected to the ECU 40 via an actuator, and the aperture thereof is electromagnetically controlled by the ECU 40.

The exhaust-gas recirculation path 6 connects the exhaust plumbing 4 and the intake manifold 3, and recirculates a portion of the exhaust emitted from the engine 1. An EGR valve 13 that controls the flow rate of exhaust gas being recirculated is provided in the exhaust-gas recirculation path 6. The EGR valve 13 is connected to the ECU 40 via an actuator, which is not illustrated, and the valve aperture thereof is electromagnetically controlled by the ECU 40.

The catalytic converter 31 and the NOx purification catalyst 33 are provided in this sequence from an upstream side in the exhaust plumbing 4 downstream of the turbocharger 8.

The catalytic converter 31 includes a three-way catalyst that continuously reduces NOx in the exhaust using reductive gas supplied from the fuel reformer 50 described later. This catalytic converter 31 contains rhodium (Rh), which has an ability to reduce NOx in the exhaust, and ceria ($CeO_2$), which has oxygen storage ability.

In the present embodiment, a substance, which is prepared by producing a slurry by way of agitating and mixing 2.4 (g/L) of platinum (Pt), 1.2 (g/L) of rhodium, 6.0 (g/L) of palladium (Pd), 50 (g/L) of ceria, 150 (g/L) of alumina ($Al_2O_3$), and 10 of binder along with an aqueous medium in a ball mill, then after coating this slurry on a support made of Fe—Cr—Al alloy, drying and calcining this at 600° C. over 2 hours, is used for the catalytic converter 31.

The NOx purification catalyst 33 includes platinum (Pt) that acts as a catalyst and is supported on a carrier of alumina ($Al_2O_3$), ceria ($CeO_2$), and a complex oxide of cerium and a rare earth metal (hereinafter referred to as "ceria-based complex oxide"), a ceria or a ceria-based complex oxide having NOx adsorption capacity, and a zeolite having a function of retaining ammonia ($NH_3$) generated on the catalyst as ammonium ion ($NH_4^+$).

In the present embodiment, a material formed by loading a NOx reduction catalyst composed of two layers onto a catalyst support is used as the NOx purification catalyst 33.

The lower layer of the NOx reduction catalyst is formed by producing a slurry by placing a material constituted with 4.5 (g/L) of platinum, 60 (g/L) of ceria, 30 (g/L) of alumina, 60 (g/L) of Ce—Pr—La—Ox, and 20 (g/L) of Zr—Ox into a ball mill with an aqueous medium, then agitating and mixing, followed by coating this slurry on the catalyst support.

In addition, the upper layer of the NOx reduction catalyst is formed by producing a slurry by placing a material constituted with 75 (g/L) of a beta zeolite ion-exchanged with iron (Fe) and cerium (Ce), 7 (g/L) of alumina, and 8 (g/L) of a binder into a ball mill with an aqueous medium, then agitating and mixing, followed by coating this slurry on the lower layer described above.

When the amount of adsorbed ammonia of the NOx purification catalyst 33 is small, since the NOx purification ability decreases, supply of a reducing agent (hereinafter referred to as "reduction") to the NOx purification catalyst 33 is performed in order to reduce the NOx appropriately. With this reduction, for example, the reducing agent is supplied to the NOx purification catalyst 33 by making the air/fuel ratio (engine air/fuel ratio) of the mixture inside the combustion chamber of the engine 1 to be richer than stoichiometric by way of increasing the fuel amount injected from the fuel injectors and decreasing the intake air amount with the throttle valve 9. In other words, by enriching the air/fuel ratio (exhaust air/fuel ratio) of exhaust emitted from the engine 1, the concentration of reducing agent in the exhaust flowing into the NOx purification catalyst 33 becomes higher than the concentration of oxygen, thereby carrying out reduction.

Purification of NOx in this NOx purification catalyst 33 will be explained.

First, the engine air/fuel ratio is set to be leaner than stoichiometric, and when so-called lean burn operation is performed, the concentration of reducing agent in the exhaust flowing into the NOx purification catalyst 33 becomes lower than the concentration of oxygen. As a result thereof, nitrogen monoxide (NO) and oxygen ($O_2$) in the exhaust react by action of the catalyst, and are adsorbed to the ceria or the ceria-based complex oxide as $NO_2$. In addition, carbon monoxide (CO) that has not reacted with oxygen is also adsorbed to the ceria or the ceria-based complex oxide.

Next, so-called rich operation is performed in which the engine air/fuel ratio is set to be richer than stoichiometric, and the exhaust air/fuel ratio is enriched. In other words, when reduction to make the concentration of the reducing agent in the exhaust higher than the concentration of oxygen is carried out, carbon dioxide ($CO_2$) and hydrogen ($H_2$) are generated by carbon monoxide in the exhaust reacting with water ($H_2O$), and carbon monoxide (CO) and carbon dioxide ($CO_2$) as well as hydrogen are generated by hydrocarbons (HC) in the exhaust reacting with water. Furthermore, NOx contained in the exhaust and NOx (NO, $NO_2$) adsorbed to the ceria or the ceria-based complex oxide (and platinum) react with the hydrogen thus generated by action of the catalyst, thereby generating ammonia ($NH_3$) and water. In addition, the ammonia thus generated here is adsorbed to the zeolite in the form of ammonium ions ($NH_4^+$).

Next, lean burn operation is performed in which the engine air/fuel ratio is set to be leaner than stoichiometric, and when the concentration of the reducing agent in the exhaust flowing into the NOx purification catalyst 33 is set to be lower than the concentration of oxygen, NOx is adsorbed to the ceria or the ceria-based complex oxide. Furthermore, in a state where ammonium ions are adsorbed to the zeolite, NOx and oxygen in the exhaust react with ammonia, thereby generating nitrogen ($N_2$) and water.

In this way, according to the NOx purification catalyst 33, ammonia generated during reducing agent supply is adsorbed to the zeolite, and the ammonia adsorbed during lean burn operation reacts with NOx; therefore, it is possible to perform purification of NOx efficiently.

In addition, a fuel reformer 50, which reforms fuel gas to produce a reformed gas containing hydrogen ($H_2$), and carbon monoxide (CO) is connected upstream of the NOx purification catalyst 33 inside the exhaust plumbing 4. This fuel reformer 50 supplies the reformed gas thus produced into the exhaust plumbing 4 from an inlet 14 formed upstream of the catalytic converter 31 inside the exhaust plumbing 4 as reductive gas.

The fuel reformer 50 is configured to include a gas path 51 that connects one end side to the exhaust plumbing 4, a fuel gas supply device 52 that supplies fuel gas from another end side of this gas path 51, and a reforming catalyst 53 as a reforming catalyst provided in the gas path 51.

The fuel gas supply device 52 produces fuel gas by mixing fuel stored in a fuel tank and air supplied by the compressor at a predetermined ratio, and supplies this fuel gas to the gas path 51. This fuel gas supply device 52 is connected to the ECU 40, and a supply amount of fuel gas and a mixture ratio thereof are controlled by the ECU 40. In addition, it is made possible to control the supply amount (amount of reducing gas supplied into the exhaust plumbing 4 per unit time) of reductive gas supplied to the exhaust plumbing 4 by controlling the supply amount of this fuel gas.

The reforming catalyst 53 contains rhodium and ceria. This reforming catalyst 53 is a catalyst that reforms the fuel gas supplied from the fuel gas supply device 52, and produces a reformed gas containing hydrogen, carbon monoxide, and hydrocarbons. More specifically, this reforming catalyst 53 produces reformed gas that is higher pressure than atmospheric pressure and contains more carbon monoxide than hydrogen by volume ratio by way of the partial oxidation reaction of hydrocarbon fuel constituting the fuel gas and air. In other words, the reformed gas contains more carbon monoxide than hydrogen. In addition, as described above, the partial oxidation reaction is an exothermal reaction. As a result, the fuel reformer 50 is able to supply into the exhaust plumbing 4 reducing gas of a temperature that is higher than the exhaust in the vicinity of the inlet 14 in the exhaust plumbing 4.

In the present embodiment, a substance, which is prepared by weighing fine powders of ceria and rhodium so as to make the mass ratio of rhodium to ceria be 1%, producing a slurry by placing this fine powder into a ball mill along with an aqueous medium and agitating and mixing, then after coating this slurry on a support made of Fe—Cr—Al alloy, drying and calcining this at 600° C. over 2 hours, is used as this reforming catalyst 53.

In addition, a heater (not illustrated) configured to include a glow plug, spark plug, or the like is connected to the reforming catalyst 53, whereby it is possible to heat the reforming catalyst 53 with startup of the fuel reformer 50. Moreover, the fuel reformer 50 is provided separately from the exhaust plumbing 4. In other words, the fuel gas supply device 52 and reforming catalyst 53 of the fuel reformer 50 are not provided in the exhaust plumbing 4.

A first exhaust temperature sensor 26 that detects a temperature TU of exhaust flowing through the exhaust plumbing 4 between the inlet 14 and the catalytic converter 31, and a second exhaust temperature sensor 27 that detects a temperature of exhaust flowing through the exhaust plumbing 4 between the catalytic converter 31 and the NOx purification catalyst 33 are connected to the ECU 40, and the detection signals of these sensors are supplied to the ECU 40.

Here, a revolution speed NE of the engine 1 is calculated by the ECU 40 based on the output of the crank angle position sensor. In addition, the generated torque of the engine 1 is calculated by the ECU 40 based on the fuel injection amount of the fuel injectors determined according to the depression amount AP of the accelerator pedal, which is not illustrated.

The ECU 40 includes an input circuit that has functions such as of shaping input signal wave forms from every kind of sensor, correcting the voltage levels to predetermined levels, and converting analog signal values to digital signal values, and a central processing unit (hereinafter referred to as "CPU"). In addition to this, the ECU 40 includes a storage circuit that stores every kind of calculation program executed by the CPU and calculation results, and an output circuit that outputs control signals to the fuel reformer 50, throttle valve 9, EGR valve 13, turbocharger 8, fuel injectors of the engine 1, and the like.

The engine 1 is normally operated (lean-burn operation) by setting the engine air/fuel ratio to be leaner than the stoichiometric ratio, and enrichment control to set the engine air/fuel ratio to be richer than the stoichiometric ratio is performed periodically.

In addition, in the present embodiment, early activity control that quickly raises the temperature of the catalytic converter 31 and the NOx purification catalyst 33 up to an activation temperature is executed every predetermined time period by employing reductive gas produced by the fuel reformer 50.

Figure 2:
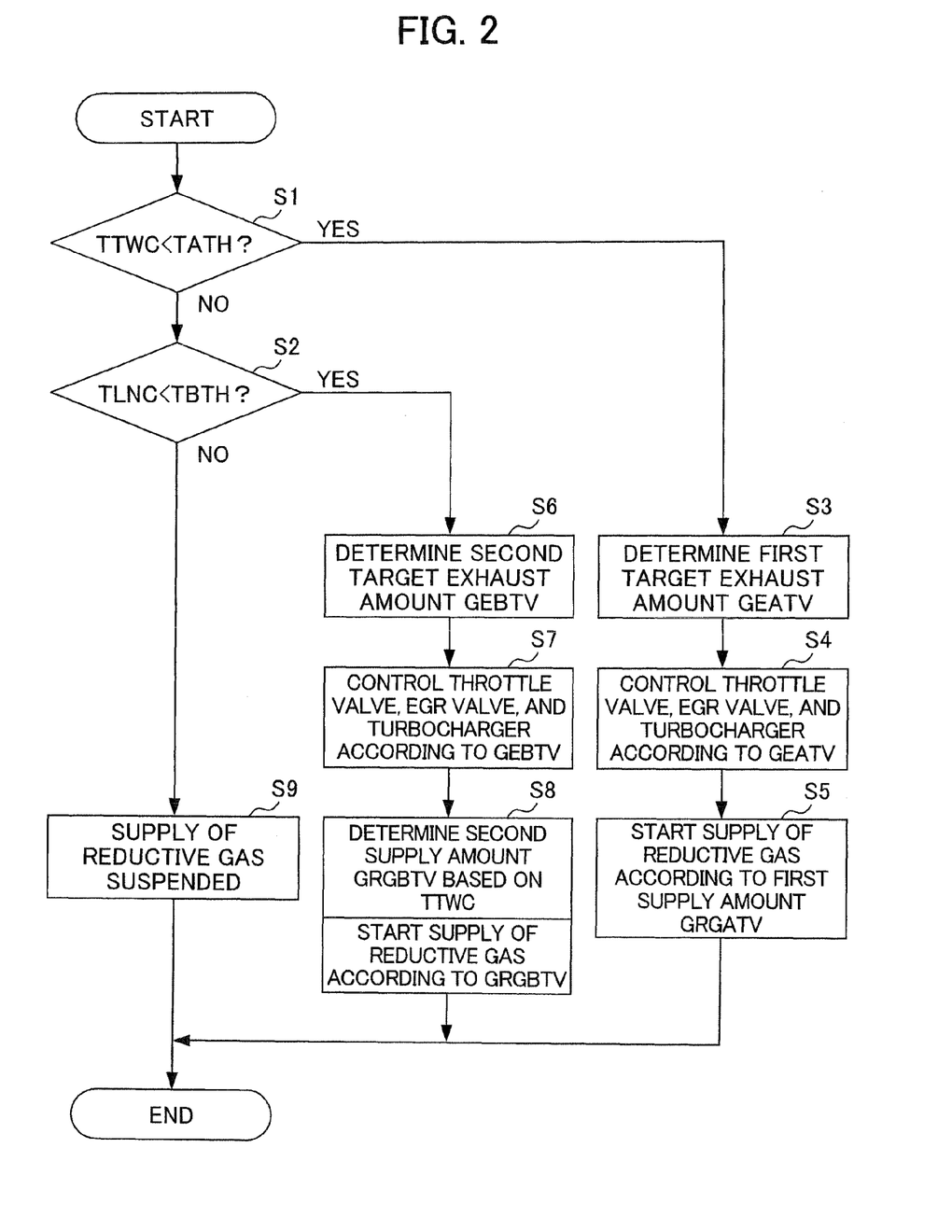
FIG. 2 is a flowchart showing a sequence of early activity control during lean-burn operation by an ECU according to the embodiment.

FIG. 2 is a flowchart showing a sequence of early activity control during lean-burn operation by the ECU.

In Step S1, a temperature TTWC of the catalytic converter is estimated, and it is determined whether this catalytic converter temperature TTWC is lower than a predetermined judgment temperature TAHT. In a case of this determination being YES, Step S3 is advanced to, and in a case of being NO, Step S2 is advanced to. Herein, the catalytic converter temperature TTWC is estimated based on the temperature TU of exhaust on an upstream side of the catalytic converter detected by the first exhaust temperature sensor. In addition, this judgment temperature TATH, for example, is set to the activation temperature of the catalytic converter.

In Step S2, the temperature TLNC of the NOx purification catalyst is estimated, and it is determined whether this NOx purification catalyst temperature TLNC is lower than a predetermined judgment temperature TBTH. In a case of this determination being YES, Step S6 is advanced to, and in a case of being NO, Step S9 is advanced to. Herein, the NOx purification catalyst temperature TLNC is estimated based on the temperature TD of exhaust on a downstream side of the catalytic converter detected by the second exhaust temperature sensor. In addition, this judgment temperature TBTH is set to the activation temperature of the NOx purification catalyst.

In Step S3, a first target exhaust flow rate GEATV is determined, and Step S4 is advanced to. This first target exhaust flow rate GEATV is a target value of the flow rate of exhaust flowing through the exhaust plumbing. In the present embodiment, for example, although this first target exhaust flow rate GEATV is determined with a predetermined control map so as to become lower with the catalytic converter temperature TTWC becoming lower, it is not limited thereto.

In Step S4, at least one among the throttle valve, EGR valve, and turbocharger are controlled so that the flow rate of exhaust matches the first target exhaust flow rate GEATV, and Step S5 is advanced to. More specifically, the flow rate of exhaust is made to match the first target exhaust flow rate GEATV by way of reducing the intake air amount by closing the throttle valve, increasing the exhaust recirculation amount by opening the EGR valve, or lowering the boost pressure by controlling the turbocharger, or by way of performing these controls together.

In Step S5, supply of reductive gas produced by the fuel reformer is started in response to a predetermined first supply amount (amount of reductive gas supplied into the exhaust plumbing per unit time) GRGATV, and then ends. It should be noted that the supply of this reductive gas is executed until the catalytic converter temperature TTWC reaches the first judgment temperature TATH (refer to the above Step S1).

In Step S6, a second target exhaust flow rate GEBTV is determined, and Step S7 is advanced to. In the present embodiment, for example, although this second target exhaust flow rate GEBTV is determined with a predetermined control map so as to become smaller with the catalytic converter temperature TTWC becoming lower, it is not limited thereto.

In Step S7, at least one among the throttle valve, EGR valve, and turbocharger are controlled so that the flow rate of exhaust matches the second target exhaust flow rate GEBTV, and Step S8 is advanced to.

In Step S8, a second supply amount (amount of reductive gas supplied into the exhaust plumbing per unit time) GRGBTV is determined based on the catalytic converter temperature TTWC, supply of reductive gas is started according to this second supply amount GRGBTV, and then is ended. It should be noted that the supply of this reductive gas is executed until the NOx catalyst temperature TLNC reaches the second temperature TBTH (refer to the above Step S2).

Figure 3:
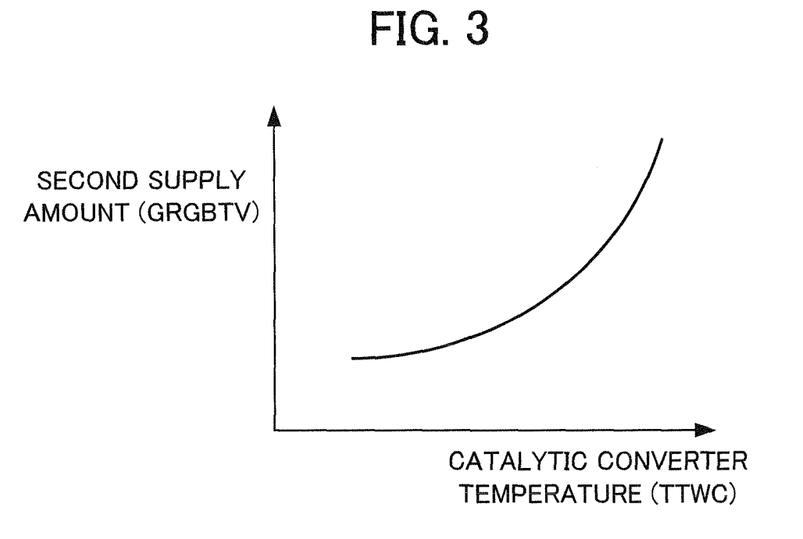
FIG. 3 is a graph showing a relationship between the catalytic converter temperature and second supply amount according to the embodiment.

FIG. 3 is a graph showing a relationship between the catalytic converter temperature TTWC and the second supply amount, and is a graph showing an example of a control map referred to in Step S8. In FIG. 3, the horizontal axis shows the catalytic converter temperature TTWC, and the vertical axis shows the second supply amount. As shown in FIG. 3, the second supply amount becomes large with the catalytic converter temperature TTWC becoming higher.

Referring again to FIG. 2, in Step S9, the supply of reductive gas is suspended, and then ends.

Herein, when comparing the first supply amount GRGATV and the second supply amount GRGBTV, the first supply amount GRGATV is smaller than the second supply amount GRGBTV in the present embodiment. In addition, when comparing the first target exhaust flow rate GEATV and the second target exhaust flow rate GEBTV, the first target exhaust flow rate GEATV is larger than the second target exhaust flow rate GEBTV in the present embodiment.

In addition, the first supply amount GRGATV, second supply amount GRGBTV, first target exhaust flow rate GEATV, and second target exhaust flow rate GEBTV are set so that the exhaust air/fuel ratio of exhaust flowing into the catalytic converter is always at the stoichiometric ratio or higher.

As explained in detail above, according to the present embodiment, the catalytic converter 31 is provided upstream of the NOx purification catalyst 33, and further, reducing gas containing hydrogen and carbon monoxide is supplied from this catalytic converter 31. In this way, even if immediately after startup of the engine 1, for example, the catalytic converter 31 can be quickly raised in temperature up to the activation temperature thereof by supplying reducing gas containing hydrogen and carbon monoxide, which excels in oxidation reactivity at low temperature. In addition, while setting the exhaust air/fuel ratio to lean, exhaust having an oxygen concentration, hydrogen concentration, and carbon monoxide concentration that are high can be supplied to the catalytic converter 31 by supplying such a reducing gas. Therefore, an oxidation reaction can be realized in the catalytic converter 31 from a low temperature.

As described above, the aforementioned problems occurring by reducing the intake air amount and executing post injection at low temperatures, i.e. deterioration in fuel economy, occurrence of oil dilution, destabilization in combustion of the internal combustion engine, etc. can be avoided by raising the temperature of the catalytic converter 31 by supplying reducing gas.

In addition, by providing the fuel reformer 50 producing reducing gas to be separate from the exhaust plumbing 4, reducing gas can always be produced at optimal efficiency, irrespective of the operating state of the engine 1, the oxygen concentration and steam concentration of exhaust, etc., and this reducing gas can be supplied into the exhaust channel. Moreover, it becomes possible to supply reducing gas in response to requirements such as the operating state of the engine 1 by providing the fuel reformer 50 to be separate from the exhaust plumbing 4.

On the other hand, in a case of providing the fuel reformer 50 inside the exhaust plumbing 4, it is necessary to enlarge the fuel reformer 50 so as to be able to operate without influencing the components, temperature, and flow rate of the exhaust; however, according to the present embodiment, it is possible to perform operation stably without enlarging the device by providing the fuel reformer 50 to be separate from the exhaust plumbing 4. In addition, by providing the fuel reformer to be separate from the exhaust plumbing 4, it becomes possible to activate the catalyst provided to the fuel reformer at an early stage by performing control of an independent system from the control of the engine 1.

In addition, according to the present embodiment, more carbon monoxide is contained in the reducing gas than hydrogen. Carbon monoxide is catalytically combusted at a lower temperature than hydrogen. This catalytic converter 31 can be effectively raised in temperature from a low temperature by supplying such a reducing gas containing carbon monoxide to the catalytic converter 31. In addition, along with supplying such a reducing gas, this catalytic converter can be more effectively raised in temperature by palladium, rhodium, or the like, which adsorb large amounts of carbon monoxide, being contained in the catalytic converter 31.

Moreover, according to the present embodiment, reducing gas produced by the fuel reformer 50 is supplied on an upstream side of the catalytic converter 31 until the temperature TTWC of the catalytic converter 31 reaches the predetermined first judgment temperature TATH. Herein, the catalytic converter 31 can be quickly raised in temperature up to the activation temperature, for example, by setting the first judgment temperature TATH to the activation temperature of the catalytic converter 31.

In addition, reducing gas can be supplied into the exhaust plumbing 4 without adding an extra device by supplying reducing gas of a pressure higher than atmospheric pressure.

Furthermore, according to the present embodiment, after the catalytic converter 31 has reached the first judgment temperature TATH, reducing gas is supplied until the NOx purification catalyst 33 reaches the second judgment temperature TBTH. Herein, when the first judgment temperature TATH is set to the activation temperature of the catalytic converter 31, for example after the catalytic converter 31 has reached the activation temperature, the temperature of the exhaust is raised by the oxidation reaction in this catalytic converter 31, thereby enabling the NOx purification catalyst 33 provided downstream of the catalytic converter 31 to rise in temperature quickly.

In addition, according to the present embodiment, the flow rate of exhaust until when the temperature TTWC of the catalytic converter 31 reaches the first judgment temperature TATH is larger than the flow rate of exhaust after the temperature TTWC of the catalytic converter 31 has reached the first judgment temperature TATH. In other words, after the temperature of the catalytic converter 31 has reached the first judgment temperature TATH, the oxidation reaction in the catalytic converter 31 progresses due to limiting the flow rate of the exhaust, and the temperature of the exhaust can be further raised. This enables the NOx purification catalyst 33 on a downstream side of the catalytic converter 31 to rise in temperature quickly.

In addition, according to the present embodiment, the supply amount of reducing gas until when the temperature TTWC of the catalytic converter 31 reaches the first judgment temperature TATH is less than the supply amount after the temperature TTWC of the catalytic converter 31 has reached the first judgment temperature TATH. In other words, after the temperature of the catalytic converter 31 has reached the first judgment temperature TATH, the oxidation reaction in the catalytic converter 31 progresses due to the supply amount of reducing gas being made large, and the temperature of the exhaust is caused to rise further. This enables the NOx purification catalyst on a downstream side of the catalytic converter 31 to rise in temperature quickly.

In addition, according to the present embodiment, the supply amount of reducing gas is also increased with the rise in temperature of the catalytic converter 31. In other words, reducing gas of an amount depending on the activity of the catalytic converter 31 can be supplied. This enables an amount of extra reducing gas discharging to a downstream side without being completely oxidized by the catalytic converter 31 to be reduced.

In addition, according to the present embodiment, this fuel reformer 50 can be made a smaller size by producing reducing gas by way of the partial oxidation reaction. In other words, this is because a device to supply extra energy from outside does not need to be provided since the partial oxidation reaction as described above is an exothermic reaction, and once the reaction starts, the reaction progresses spontaneously. In addition, there is also no need to also provide a converter and system for concentrating hydrogen of a shift reaction, etc. Moreover, the light-off time of the fuel reformer 50 can be shortened by making the fuel reformer 50 to be small in this way. Therefore, reducing gas can be quickly supplied into the exhaust plumbing 4 as needed.

Incidentally, when fuel is reformed by way of the partial oxidation reaction, higher hydrocarbons having high combustion temperatures are generated in a small amount while the fuel reformer 50 is lighting off. If such higher hydrocarbons flow into the NOx purification catalyst 33, purification may become difficult. However, the higher hydrocarbons are easily adsorbed to the catalyst at low temperatures or at an insignificant amount. As a result, by providing the catalytic converter 31 on an upstream side of the NOx purification catalyst 33 as described above, such higher hydrocarbons are immediately adsorbed and can be purified by the catalytic converter 31.

In the present embodiment, the ECU 40 configures the control means, a portion of the first activation means, a portion of the second activation means, and portions of the first temperature estimation means and the second temperature estimation means. More specifically, the means related to Steps S1 to S9 of FIG. 2 correspond to the control means, the means related to Steps S3 to S5 and the fuel reformer 50 correspond to the first activation means, the means related to Steps S6 to S8 and the fuel reformer 50 correspond to the second activation means, the means related to Step S1 and the first exhaust temperature sensor 26 correspond to the first temperature estimation means, and the means related to Step S2 and the second exhaust temperature sensor 27 correspond to the second temperature estimation means.

Next, NOx purification evaluation tests to verify the effects due to supplying reductive gas to the exhaust plumbing as in the above-mentioned embodiment will be explained with reference to FIGS. 4 and 5.

NOx Purification Performance Evaluation Test Method

Figure 4:
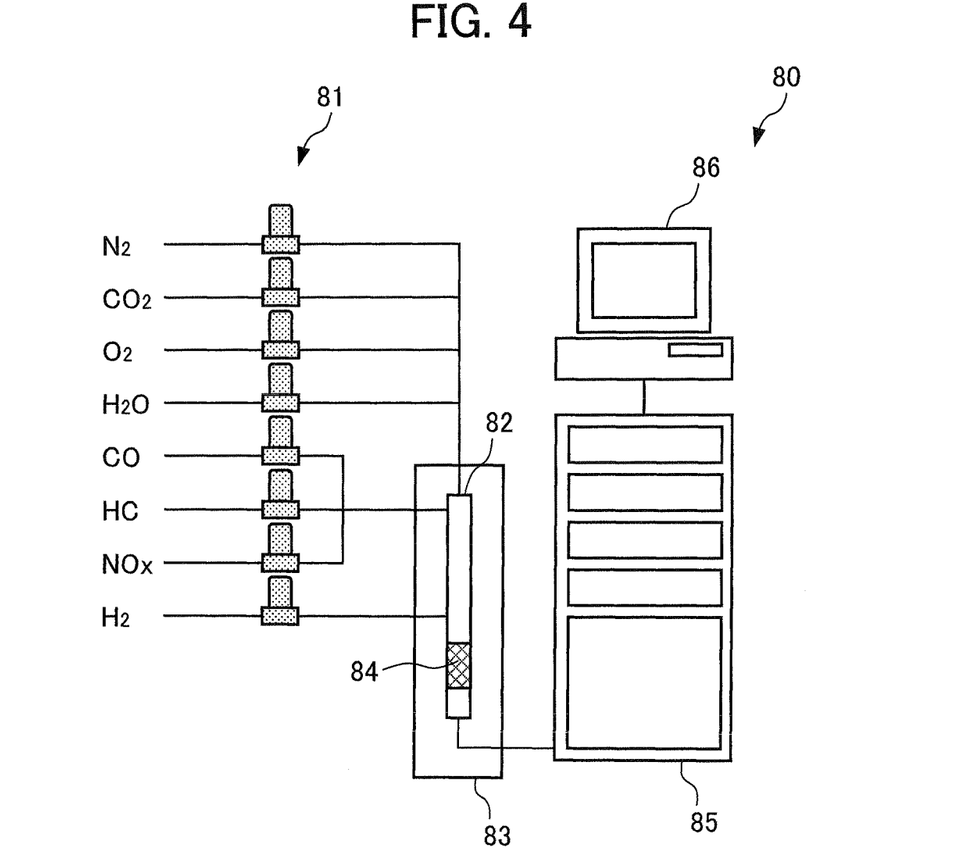
FIG. 4 is a schematic diagram showing a configuration of a test apparatus for NOx purification performance evaluation tests.

FIG. 4 is a schematic diagram showing a configuration of a test apparatus 80 for NOx purification performance evaluation tests.

The test apparatus 80 is configured to include a supply device 81 that supplies model gas at a predetermined composition, a heater 83 that is provided with adsorbent 84 inside thereof, a gas analyzer 85 that analyzes the model gas, and a computer 86 for data acquisition.

The supply device 81 supplies model gas constituted by $N_2$, $CO_2$, $O_2$, $H_2O$, CO, HC, NOx, and $H_2$ to the heater 83. This supply device 81 makes it possible to adjust the flow rate of each component of the model gas.

The heater 83 is provided with a reactor 82 and adsorbent 84 inside thereof, and heats this reactor 82 and adsorbent 84. The reactor 82 mixes and supplies to the adsorbent 84 the model gas supplied from the supply device 81.

The adsorbent 84 uses a material constituted by a three-way catalyst and a NOx purification catalyst. Herein, since the same materials as the catalytic converter 31 and NOx purification catalyst 33 (refer to FIG. 1 described above) described in the above embodiment are used in this three-way catalyst and NOx purification catalyst, explanations thereof are omitted.

The gas analyzer 85 measures the NOx concentration of the model gas inside the heater 83 supplied from the reactor 82 to the adsorbent 84, and having passed through this adsorbent 84. The computer 86 for data acquisition processes data related to this NOx concentration, and calculates the NOx purification rate for each temperature. The NOx purification rate is calculated based on the following formula.

$$\text{NOx purification rate}(\%) = (Cin - Cout)/Cin \times 100$$

Here, Cin is the NOx concentration of model gas at the inlet of the adsorbent 84, and Cout is the NOx concentration of model gas at the outlet of the adsorbent 84. In addition, the NOx concentration of the model gas was measured according to a chemiluminescence method.

In the present evaluation tests, the NOx purification rate of model gas having passed the adsorbent 84 was measured in the test apparatus 80 configured as above while supplying model gas, with this model gas being heated from 50° C. up to 450° C.

In addition, the model gas was alternately supplied for the model gas of a composition of a lean atmosphere and a model gas of a composition of a rich atmosphere over 55 seconds and 5 seconds, respectively.

Example

In the model gas of the Example, model gas having the below composition was used as gas simulating the gas to which the reductive gas (containing carbon monoxide, hydrogen, and hydrocarbons) produced by the fuel reformer according to the above-mentioned embodiment to the exhaust has been added.

| Lean Atmosphere | |
|---|---|
| NO: | 90 ppm |
| CO: | 6000 ppm |

-continued

|  |  |
|---|---|
| HC (propylene): | 500 ppmC ($C_3H_6$) |
| $O_2$: | 6% |
| $CO_2$: | 6% |
| $H_2O$: | 7% |
| $N_2$: | balance gas |
| $H_2$: | 5000 ppm |
| Rich Atmosphere | |
| NO: | 90 ppm |
| CO: | 2.1% |
| HC (propylene): | 500 ppmC ($C_3H_6$) |
| $O_2$: | 0% |
| $CO_2$: | 6% |
| $H_2O$: | 7% |
| $N_2$: | balance gas |
| $H_2$: | 6000 ppm |

SV = 50000 $h^{-1}$

Comparative Example

In the model gas of the Comparative Example, model gas having the below composition was used as gas simulating the exhaust to which the above reductive gas has not been added.

| Lean Atmosphere | |
|---|---|
| NO: | 90 ppm |
| CO: | 1000 ppm |
| HC (propylene): | 500 ppmC ($C_3H_6$) |
| $O_2$: | 6% |
| $CO_2$: | 6% |
| $H_2O$: | 7% |
| $N_2$: | balance gas |
| $H_2$: | 0 ppm |
| Rich Atmosphere | |
| NO: | 90 ppm |
| CO: | 2% |
| HC (propylene): | 500 ppmC ($C_3H_6$) |
| $O_2$: | 0% |
| $CO_2$: | 6% |
| $H_2O$: | 7% |
| $N_2$: | balance gas |
| $H_2$: | 0 ppm |

SV = 50000 $h^{-1}$

Test Results

Figure 5:
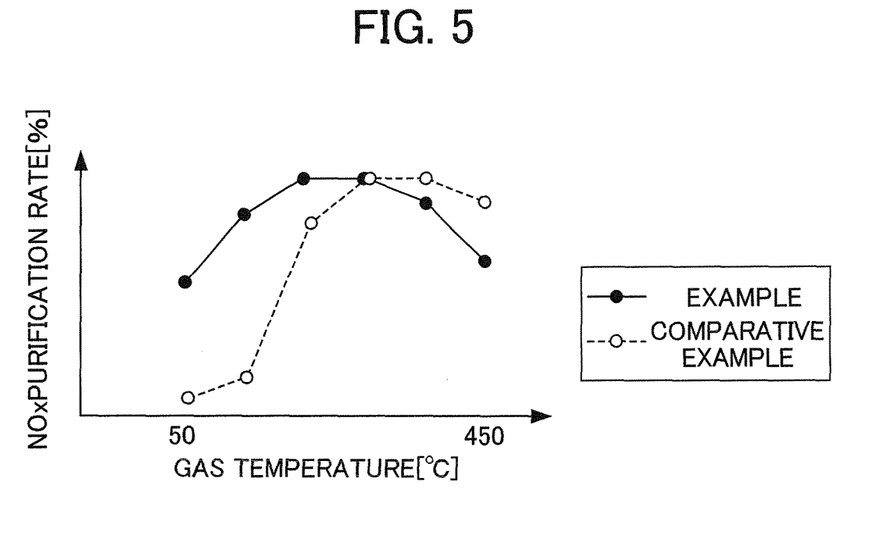
FIG. 5 is a graph showing test results of the Example and Comparative Example.

FIG. 5 is a graph showing test results of the Example and Comparative Example. In FIG. 5, the horizontal axis shows the temperature of the model gas, and the vertical axis shows the NOx purification rate. In addition, the black dots show a relationship between the gas temperature and NOx purification rate in the Example, and the white dots show a relationship between the gas temperature and the NOx purification rate in the Comparative Example.

When comparing the NOx purification rates of the Example and the NOx purification rate of the Comparative Example, the NOx purification rate of the Example is substantially constant over the entire temperature range, whereas the Comparative Example has a NOx purification rate in a low temperature range that becomes particularly small. Therefore, it has been verified that the NOx purification performance in a low temperature range in particular can be improved by adding reductive gas containing carbon monoxide and hydrogen as in the Example.

It should be noted that the present invention is not to be limited to the embodiments described above, and various modifications thereto are possible.

For example, in the embodiments described above, when reductive gas is supplied into the exhaust channel, the flow rate of exhaust flowing through the exhaust plumbing 4 was adjusted by controlling the throttle valve 9, EGR valve 13, and turbocharger 8; however, it is not limited thereto. For example, the exhaust air/fuel ratio of the exhaust flowing through the exhaust plumbing 4 may be adjusted by controlling the throttle valve 9, EGR valve 13, and turbocharger 8. Effects similar to the above-mentioned embodiments can be exerted also if configured in this way.

In the above-mentioned embodiments, although a converter containing a three-way catalyst was used as the catalytic converter 31, it is not limited thereto, and a converter containing an oxidation catalyst may be used.

In addition, in the above-mentioned embodiments, the catalytic converter temperature TTWC and the NOx purification catalyst temperature TLNC were estimated based on the temperatures TU and TD of exhaust detected by the first exhaust temperature sensor 26 and the second exhaust temperature sensor 27, respectively; however, it is not limited thereto. The catalytic converter temperature TTWC and the NOx purification catalyst temperature TLNC may each be detected directly.

Moreover, in the above-mentioned embodiments, although examples applying the present invention to a diesel internal combustion engine were exemplified, the present invention can be applied also to a gasoline internal combustion engine. In addition, the present invention can also be applied to an exhaust purification device of an engine for nautical propulsion such as an outboard engine in which the crank shaft is arranged vertically, or the like.

The invention claimed is:

1. An exhaust purification device of an internal combustion engine including a NOx purification catalyst that is provided in an exhaust channel of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich, the exhaust purification device comprising:

a catalytic converter that is provided in the exhaust channel on an upstream side from the NOx purification catalyst, and continuously reduces NOx in exhaust using a reducing gas;

a fuel reformer that is provided separately from the exhaust channel, produces a reducing gas containing hydrogen and carbon monoxide by reforming fuel, and supplies the reducing gas from an inlet provided in the exhaust channel upstream of the NOx purification catalyst and the catalytic converter into the exhaust channel;

an intake amount control valve that is provided to an intake channel of the internal combustion engine;

an exhaust recirculation amount control valve that is provided to an exhaust recirculation channel in which a portion of exhaust flowing through the exhaust channel is recirculated to the intake channel;

a turbocharger that compresses intake air flowing through the intake channel; and an electronic control unit configured to adjust, while the exhaust air/fuel ratio is set to lean, an exhaust flow rate of exhaust flowing through the exhaust channel by supplying reducing gas from the fuel reformer and controlling at least one among the intake amount control valve, the exhaust recirculation amount control valve, and the turbocharger;

a first temperature estimation means for estimating or detecting, with a temperature of the catalytic converter as a first catalyst temperature, the first catalyst temperature; and a second temperature estimation means for estimating or detecting, with a temperature of the NOx purification catalyst as a second catalyst temperature, the second catalyst temperature, wherein the electronic control unit includes:

a first activation control that supplies reducing gas from the fuel reformer into the exhaust channel, in a case in which the estimated or detected first catalyst temperature is lower than a predetermined first judgment temperature, until the first catalyst temperature reaches the first judgment temperature, and a second activation control that supplies reducing gas from the fuel reformer into the exhaust channel, in a case in which, after the estimated or detected first catalyst temperature has reached the first judgment temperature, the estimated or detected second catalyst temperature is lower than a predetermined second judgment temperature, until the second catalyst temperature reaches the second judgment temperature.

2. An exhaust purification device of an internal combustion engine according to claim 1, wherein the reducing gas produced by the fuel reformer is at a pressure higher than atmospheric pressure and contains more carbon monoxide than hydrogen by volume ratio.

3. An exhaust purification device of an internal combustion engine according to claim 1, wherein the flow rate of exhaust flowing through the exhaust channel while supplying reducing gas by the first activation means is larger than a flow rate of exhaust flowing through the exhaust channel while supplying reducing gas by the second activation means.

4. An exhaust purification device of an internal combustion engine according to claim 3, wherein a supply amount of reducing gas while supplying reducing gas by the first activation means is less than a supply amount of reducing gas while supplying reducing gas by the second activation means.

5. An exhaust purification device of an internal combustion engine according to claim 4, wherein the supply amount of reducing gas supplied by the second activation means is increased as the estimated or detected first temperature increases.

6. An exhaust purification device of an internal combustion engine according to claim 5, wherein the exhaust air/fuel ratio of exhaust flowing into the catalytic converter is always at least a stoichiometric ratio while supplying reducing gas from the fuel reformer.

7. An exhaust purification device of an internal combustion engine according to claim 6, wherein the fuel reformer produces reducing gas with carbon monoxide as a main component by way of a partial oxidation reaction of hydrocarbon fuel and air.

8. An exhaust purification device of an internal combustion engine including a NOx purification catalyst that is provided in an exhaust channel of the internal combustion engine and that, with an air/fuel ratio of exhaust flowing in the exhaust channel as an exhaust air/fuel ratio, adsorbs or occludes NOx in exhaust when the exhaust air/fuel ratio is made lean, and reduces the NOx adsorbed or occluded when the exhaust air/fuel ratio is made rich, the exhaust purification device comprising:

a catalytic converter that is provided in the exhaust channel on an upstream side from the NOx purification catalyst, and continuously reduces NOx in exhaust using a reducing gas;

a fuel reformer that is provided separately from the exhaust channel, produces a reducing gas containing hydrogen and carbon monoxide by reforming fuel, and supplies the reducing gas from an inlet provided in the exhaust channel upstream of the NOx purification catalyst and the catalytic converter into the exhaust channel;

an intake amount control valve that is provided to an intake channel of the internal combustion engine;

an exhaust recirculation amount control valve that is provided to an exhaust recirculation channel in which a portion of exhaust flowing through the exhaust channel is recirculated to the intake channel;

a turbocharger that compresses intake air flowing through the intake channel; and an electronic control unit configured to adjust, while the exhaust air/fuel ratio is set to lean, an exhaust air/fuel ratio of exhaust flowing through the exhaust channel by supplying reducing gas from the fuel reformer and controlling at least one among the intake amount control valve, the exhaust recirculation amount control valve, and the turbocharger;

a first temperature estimation means for estimating or detecting, with a temperature of the catalytic converter as a first catalyst temperature, the first catalyst temperature; and a second temperature estimation means for estimating or detecting, with a temperature of the NOx purification catalyst as a second catalyst temperature, the second catalyst temperature, wherein the electronic control unit includes:

a first activation control that supplies reducing gas from the fuel reformer into the exhaust channel, in a case in which the estimated or detected first catalyst temperature is lower than a predetermined first judgment temperature, until the first catalyst temperature reaches the first judgment temperature, and a second activation control that supplies reducing gas from the fuel reformer into the exhaust channel, in a case in which, after the estimated or detected first catalyst temperature has reached the first judgment temperature, the estimated or detected second catalyst temperature is lower than a predetermined second judgment temperature, until the second catalyst temperature reaches the second judgment temperature.

9. An exhaust purification device of an internal combustion engine according to claim 8, wherein the reducing gas produced by the fuel reformer is at a pressure higher than atmospheric pressure and contains more carbon monoxide than hydrogen by volume ratio.

10. An exhaust purification device of an internal combustion engine according to claim 8, wherein the flow rate of exhaust flowing through the exhaust channel while supplying reducing gas by the first activation means is larger than a flow rate of exhaust flowing through the exhaust channel while supplying reducing gas by the second activation means.

11. An exhaust purification device of an internal combustion engine according to claim 10, wherein a supply amount of reducing gas while supplying reducing gas by the first activation means is less than a supply amount of reducing gas while supplying reducing gas by the second activation means.

12. An exhaust purification device of an internal combustion engine according to claim 11, wherein the supply amount of reducing gas supplied by the second activation means is increased as the estimated or detected first temperature increases.

13. An exhaust purification device of an internal combustion engine according to claim 12, wherein the exhaust air/ fuel ratio of exhaust flowing into the catalytic converter is always at least a stoichiometric ratio while supplying reducing gas from the fuel reformer.

14. An exhaust purification device of an internal combustion engine according to claim 13, wherein the fuel reformer produces reducing gas with carbon monoxide as a main component by way of a partial oxidation reaction of hydrocarbon fuel and air.

* * * * *